United States Patent
Chen et al.

(10) Patent No.: US 11,382,089 B2
(45) Date of Patent: Jul. 5, 2022

(54) INFORMATION TRANSMISSION METHOD AND DEVICE, STORAGE MEDIUM AND ELECTRONIC DEVICE

(71) Applicant: ZTE Corporation, Shenzhen (CN)

(72) Inventors: Xianming Chen, Shenzhen (CN); Bo Dai, Shenzhen (CN); Huiying Fang, Shenzhen (CN); Kun Liu, Shenzhen (CN); Weiwei Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 98 days.

(21) Appl. No.: 16/960,105

(22) PCT Filed: Aug. 20, 2018

(86) PCT No.: PCT/CN2018/101283
§ 371 (c)(1),
(2) Date: Jul. 6, 2020

(87) PCT Pub. No.: WO2019/148813
PCT Pub. Date: Aug. 8, 2019

(65) Prior Publication Data
US 2021/0105748 A1    Apr. 8, 2021

(30) Foreign Application Priority Data
Jan. 30, 2018  (CN) .......................... 201810091907.1

(51) Int. Cl.
*H04W 4/00* (2018.01)
*H04W 72/04* (2009.01)
(Continued)

(52) U.S. Cl.
CPC ........ *H04W 72/042* (2013.01); *H04B 7/0626* (2013.01); *H04L 1/1812* (2013.01); *H04L 5/0055* (2013.01); *H04W 76/27* (2018.02)

(58) Field of Classification Search
None
See application file for complete search history.

(56) References Cited

U.S. PATENT DOCUMENTS

2012/0314685 A1* 12/2012 Chen ..................... H04L 5/0057
370/329
2013/0301448 A1* 11/2013 Sayana ................. H04W 24/10
370/252
(Continued)

FOREIGN PATENT DOCUMENTS

CN          101917259 A    12/2010
CN          103380639 A    10/2013
(Continued)

OTHER PUBLICATIONS

International Search Report for corresponding application PCT/CN2018/101283 filed Aug. 20, 2018; dated Nov. 14, 2018.
(Continued)

*Primary Examiner* — Zewdu A Beyen
(74) *Attorney, Agent, or Firm* — Cantor Colburn LLP

(57) ABSTRACT

The embodiments of the present disclosure provide an information transmission method and device, a storage medium and an electronic device. The method includes that: a Physical Downlink Control Channel (PDCCH) transmitted by a base station is received; and Channel State Information (CSI) is transmitted to the base station according to the PDCCH.

17 Claims, 2 Drawing Sheets

(51) Int. Cl.
*H04W 76/27* (2018.01)
*H04B 7/06* (2006.01)
*H04L 1/18* (2006.01)
*H04L 5/00* (2006.01)

(56) References Cited

U.S. PATENT DOCUMENTS

| | | | |
|---|---|---|---|
| 2013/0336273 A1 | 12/2013 | Takeda | |
| 2015/0124638 A1* | 5/2015 | Sun | H04L 1/0036 370/252 |
| 2015/0312791 A1 | 10/2015 | Seo | |
| 2016/0218788 A1* | 7/2016 | Yum | H04B 7/0626 |
| 2016/0262182 A1* | 9/2016 | Yang | H04W 72/04 |
| 2017/0238190 A1* | 8/2017 | Yang | H04L 5/0048 370/329 |
| 2021/0400518 A1* | 12/2021 | Song | H04W 24/10 |

FOREIGN PATENT DOCUMENTS

| | | |
|---|---|---|
| CN | 104104467 A | 10/2014 |
| CN | 104919749 A | 9/2015 |
| CN | 103270803 B | 6/2016 |
| EP | 2658331 A1 | 10/2013 |
| WO | 2014116061 A1 | 7/2014 |

OTHER PUBLICATIONS

Canadian Examination Report for corresponding application CA 3087391: Report dated Nov. 19, 2021.
European Search Report for corresponding application EP18903152; Report dated Feb. 26, 2021.
Huawei, HiSilicon, "DCI for NB-IOT," 3GPP TSG RAN WG1 Meeting #84bis, Busan Korea Apr. 11-15, 2016, R1-162626.

* cited by examiner

INFORMATION TRANSMISSION METHOD AND DEVICE, STORAGE MEDIUM AND ELECTRONIC DEVICE

CROSS-REFERENCE TO RELATED APPLICATIONS

The present application is filed based upon and claims priority to Chinese Patent Application No. 201810091907.1, filed on Jan. 30, 2018, the contents of which are hereby incorporated by reference in its entirety.

TECHNICAL FIELD

The present disclosure relates to the field of communication, and particularly to an information transmission method and device, a storage medium and an electronic device.

BACKGROUND

For meeting requirements of the cellular Internet of things, in a related art, a Narrowband-Internet of Things (NB-IoT) system is the first to be supported in Rel-13 released by the 3rd Generation Partnership Project (3GPP). In subsequent Rel-14 and Rel-15 under discussion, the NB-IoT system is enhanced, and new characteristics include positioning, multicast, capacity increase (paging and access based on non-anchor carriers), delay/power consumption reduction and time division duplex. For delay/power consumption reduction, enhanced aspects include introduction of a wakeup signal, advanced data transmission based on a random access process and support to additional transmission of system information blocks. For supporting more extensive Internet of things applications and deployment scenarios, the NB-IoT system may continue to be enhanced in Rel-16.

In the related art, User Equipment (UE) may periodically report Channel State Information (CSI) to a base station to implement downlink adaptation, thereby improving downlink resource utilization efficiency. In an NB-IoT system, UE is usually in a static or low-speed moving state (a channel state may not frequently change), and meanwhile, a transmission period of a downlink service is relatively long, so that periodic CSI reporting may cause unnecessary uplink overheads.

For the problem in the related art, there is yet no effective solution proposed at present.

SUMMARY

Embodiments of the present disclosure provide an information transmission method and device, a storage medium and an electronic device.

According to an embodiment of the present disclosure, an information transmission method is provided, which may include that: a Physical Downlink Control Channel (PDCCH) transmitted by a base station is received; and CSI is transmitted to the base station according to the PDCCH.

According to an embodiment of the present disclosure, another information transmission method is provided, which may include that: a PDCCH is transmitted to UE; and CSI transmitted by the UE is received according to the PDCCH.

According to another embodiment of the present disclosure, an information transmission device is provided, which may include: a receiving module, configured to receive a PDCCH transmitted by a base station; and a transmitting module, configured to transmit CSI to the base station according to the PDCCH.

According to another embodiment of the present disclosure, another information transmission device is provided, which may include: a transmitting module, configured to transmit a PDCCH to UE; and a receiving module, configured to receive, according to the PDCCH, CSI transmitted by the UE.

According another embodiment of the present disclosure, a storage medium is also provided, in which a computer program may be stored, the computer program being configured to run to execute the operations in any abovementioned method embodiment applied to UE.

According another embodiment of the present disclosure, another storage medium is also provided, in which a computer program may be stored, the computer program being configured to run to execute the operations in any abovementioned method embodiment applied to a base station.

According to another embodiment of the present disclosure, an electronic device is also provided, which may include a memory and a processor. A computer program may be stored in the memory. The processor may be configured to run the computer program to execute the operations in any abovementioned method embodiment applied to UE and/or a base station.

According to the embodiments of the present disclosure, the CSI is not periodically reported but transmitted to the base station according to scheduling of PDCCH data, so that the technical problem in the related art that an uplink overhead is excessively high when CSI is transmitted is solved, a resource overhead of CSI transmission between the UE and the base station is reduced, and a resource utilization rate is increased.

BRIEF DESCRIPTION OF THE DRAWINGS

The drawings described here are adopted to provide a deeper understanding to the present disclosure and form a part of the present application. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and in combination with the embodiments in detail. It is to be noted that the embodiments in the present application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Embodiment 1

Figure 1:
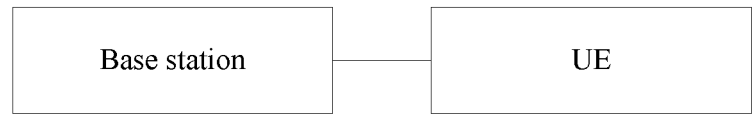
FIG. 1 is a diagram of a network architecture according to an embodiment of the present disclosure.

The embodiment of the present application may run in a network architecture shown in FIG. 1. FIG. 1 is a diagram of a network architecture according to an embodiment of the present disclosure. As shown in FIG. 1, the network architecture includes a base station and UE. The base station performs information interaction with the UE.

Figure 2:
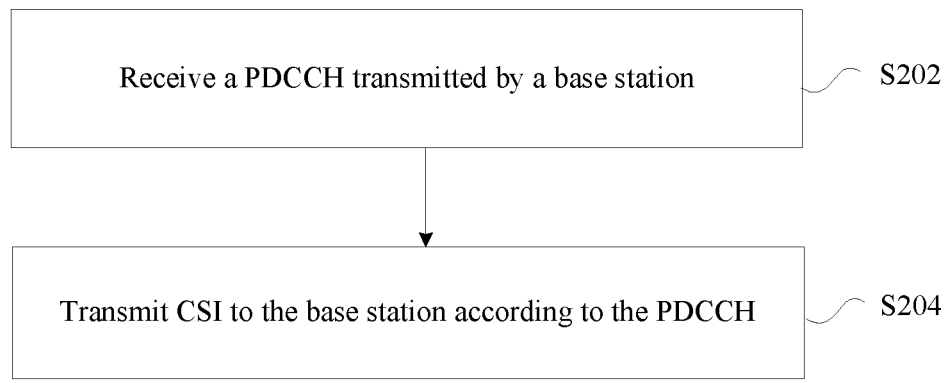
FIG. 2 is a flowchart of an information transmission method according to an embodiment of the present disclosure.

The embodiment provides an information transmission method running in the abovementioned network architecture. FIG. 2 is a flowchart of an information transmission method according to an embodiment of the present disclosure. As shown in FIG. 2, the flow includes the following operations.

In S202, a PDCCH transmitted by a base station is received.

In S204, CSI is transmitted to the base station according to the PDCCH.

Through the operations, the CSI is not periodically reported but transmitted to the base station according to scheduling of the PDCCH, so that the technical problem in the related art that an uplink overhead is excessively high when CSI is transmitted is solved, a resource overhead of CSI transmission between UE and the base station is reduced, and a resource utilization rate is increased.

In at least one exemplary implementation of the embodiment, an executer of the operations may be, but not limited to, a UE such as a mobile phone or a UE in the Internet of things.

In at least one exemplary implementation of the embodiment, the PDCCH is an uplink grant PDCCH or a downlink allocation PDCCH.

In at least one exemplary implementation of the embodiment, after the operation that the PDCCH transmitted by the base station is received, the method may further include that: a Hybrid Automatic Repeat reQuest-Acknowledgement (HARQ-ACK) feedback is transmitted to the base station according to the PDCCH.

In at least one exemplary implementation of the embodiment, the method may further include that: indication information configured to trigger UE to perform CSI reporting is acquired, the indication information being contained in at least one of:

a subcarrier indication field contained in the PDCCH;

a modulation and coding scheme field contained in the PDCCH;

a field contained in a UE-specific Radio Resource Control (RRC) message;

a Physical Downlink Shared Channel (PDSCH) transmission related field contained in the PDCCH; and K continuous bits contained in the PDCCH, a value of K being a preset value or determined according to a subcarrier spacing adopted in uplink data transmission and K being a positive integer.

In at least one exemplary implementation of the embodiment, the subcarrier indication field includes Q bits, wherein first P bits in the Q bits taking a preset value indicates that the CSI reporting is triggered, and when the CSI reporting is triggered, last Q-P bits in the Q bits are configured to indicate a subcarrier allocated for CSI transmission, both Q and P being integers greater than 0, Q being greater than P and a value of P being a preset value or determined according to the subcarrier spacing adopted in uplink data transmission.

In at least one exemplary implementation of the embodiment, the subcarrier allocated for the CSI transmission is one of X subcarriers, wherein the X subcarriers include Y continuous subcarriers close to an upper sideband and X-Y continuous subcarriers close to a lower sideband, both X and Y being integers greater than 1 and X being greater than Y.

In at least one exemplary implementation of the embodiment, the PDSCH transmission related field is a new data indicator field.

In at least one exemplary implementation of the embodiment, the HARQ-ACK feedback is transmitted to the base station at first, and the CSI is transmitted to the base station after the transmission of the HARQ-ACK feedback is completed.

In at least one exemplary implementation of the embodiment, a frequency-domain size of a resource unit corresponding to CSI transmission is the same as a frequency-domain size of a resource unit corresponding to HARQ-ACK feedback transmission, and a time-domain size of the resource unit corresponding to the CSI transmission is N times a time-domain size of the resource unit corresponding to the HARQ-ACK feedback transmission, N being greater than 1 and a value of N being a preset value or configured for a UE by the base station.

In at least one exemplary implementation of the embodiment, the CSI includes at least one of: CSI of a carrier for receiving a PDSCH, CSI of a carrier for receiving the PDCCH, CSI of a carrier with best channel quality in a measurement carrier set, CSI of a specified carrier in the measurement carrier set and CSI of all carriers in the measurement carrier set.

In at least one exemplary implementation of the embodiment, the measurement carrier set is a set formed by all carriers allowed for PDSCH transmission.

In at least one exemplary implementation of the embodiment, before the operation that the CSI is transmitted to the base station according to the PDCCH, the method may further include that: CSI measurement is performed, a subframe for CSI measurement being at least one of: all or part of subframes in a downlink subframe set for receiving PDSCH; all or part of subframes in a downlink subframe set for receiving the PDCCH; all or part of subframes in a downlink subframe set positioned between the end of PDSCH reception and the start of CSI transmission; all or part of subframes in a downlink subframe set positioned between the end of PDCCH reception and the start of PDSCH reception; and all or part of subframes in a downlink subframe set positioned between the end of PDCCH reception and the start of CSI transmission.

In at least one exemplary implementation of the embodiment, a CSI reporting mode corresponding to the CSI is determined according to one of a modulation and coding scheme field contained in the PDCCH and a Physical Random Access Channel (PRACH) coverage level, and the CSI reporting mode corresponds to at least one of the following information: a carrier corresponding to the CSI and a content of the CSI.

In at least one exemplary implementation of the embodiment, the operation determining the CSI reporting mode according to the PRACH coverage level includes that: when the PRACH coverage level is less than or equal to a preset threshold value, the CSI reporting mode is a first mode; and when the PRACH coverage level is greater than the preset threshold value, the CSI reporting mode is a second mode.

Figure 3:
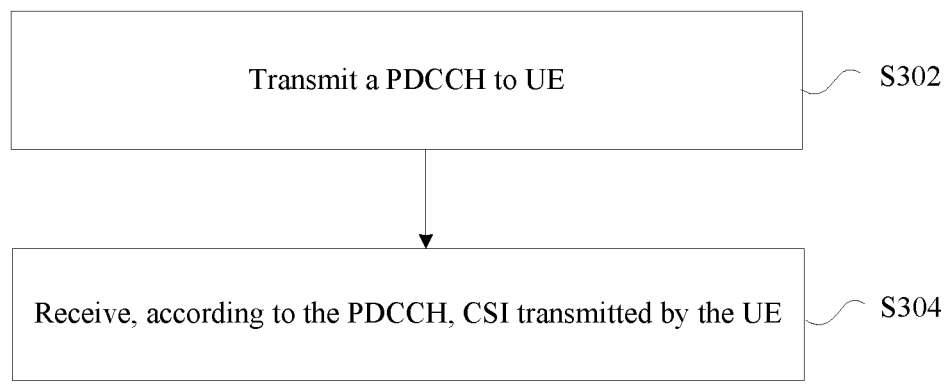
FIG. 3 is a flowchart of another information transmission method according to an embodiment of the present disclosure.

The embodiment provides an information transmission method running in the abovementioned network architecture. FIG. 3 is a flowchart of another information transmission method according to an embodiment of the present disclosure. As shown in FIG. 3, the flow includes the following operations.

In S302, a PDCCH is transmitted to UE.

In S304, CSI transmitted by the UE is received according to the PDCCH.

In at least one exemplary implementation of the embodiment, the PDCCH is an uplink grant PDCCH or a downlink allocation PDCCH.

In at least one exemplary implementation of the embodiment, after the operation that the PDCCH is transmitted to the UE, the method may further include that: a HARQ-ACK feedback is received according to the PDCCH.

In at least one exemplary implementation of the embodiment, the solution includes that: indication information configured to trigger the UE to perform CSI reporting is transmitted, the indication information being contained in at least one of:

a subcarrier indication field contained in the PDCCH;

a modulation and coding scheme field contained in the PDCCH;

a field contained in a UE-specific RRC message;

a PDSCH transmission related field contained in the PDCCH; and

K continuous bits contained in the PDCCH, a value of K being a preset value or determined according to a subcarrier spacing adopted in uplink data transmission and K being a positive integer.

In at least one exemplary implementation of the embodiment, the PDSCH transmission related field is a new data indicator field.

In at least one exemplary implementation of the embodiment, the HARQ-ACK feedback is received at first, and the CSI is received after the reception of the HARQ-ACK feedback is completed.

In at least one exemplary implementation of the embodiment, the CSI includes at least one of: CSI of a carrier for transmitting a PDSCH, CSI of a carrier for transmitting the PDCCH, CSI of a carrier with best channel quality in a measurement carrier set, CSI of a specified carrier in the measurement carrier set and CSI of all carriers in the measurement carrier set.

In at least one exemplary implementation of the embodiment, a CSI reporting mode corresponding to the CSI is indicated through a modulation and coding scheme field contained in the PDCCH; or, the CSI reporting mode corresponding to the CSI is determined according to a PRACH coverage level, and the CSI reporting mode corresponds to at least one of the following information: a carrier corresponding to the CSI and a content of the CSI.

Through the above descriptions about the implementation modes, those skilled in the art may clearly know that the methods according to the embodiment may be implemented in a manner of combining software and a required universal hardware platform and, of course, may also be implemented through hardware, but the former is an exemplary implementation mode under many circumstances. Based on such an understanding, the technical solutions of the present disclosure substantially or parts making contributions to a conventional art may be embodied in form of a software product. The computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the method of each embodiment of the present disclosure.

Embodiment 2

The embodiment also provides an information transmission device, which is configured to implement the abovementioned embodiments and exemplary implementation modes. What has been described will not be elaborated. For example, term "module" used below may be a combination of software and/or hardware capable of realizing a preset function. Although the device described in the following embodiment is preferably implemented with software, implementation with hardware or a combination of the software and the hardware is also possible and conceivable.

Figure 4:
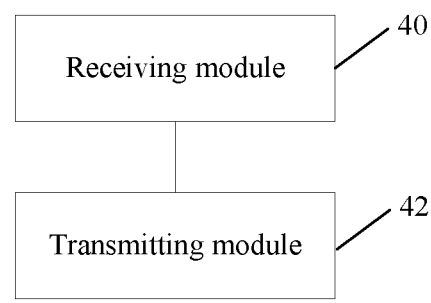
FIG. 4 is a structure block diagram of an information transmission device according to an embodiment of the present disclosure.

FIG. 4 is a structure block diagram of an information transmission device according to an embodiment of the present disclosure. As shown in FIG. 4, the device includes:

a receiving module 40, configured to receive a PDCCH transmitted by a base station; and a transmitting module 42, configured to transmit CSI to the base station according to the PDCCH.

In at least one exemplary implementation of the embodiment, the PDCCH is an uplink grant PDCCH or a downlink allocation PDCCH.

Figure 5:
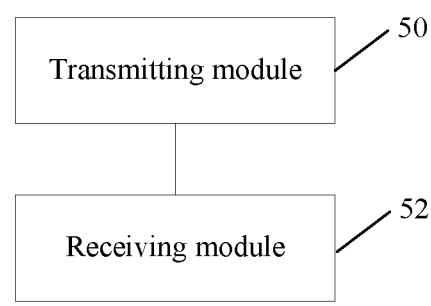
FIG. 5 is a structure block diagram of another information transmission device according to an embodiment of the present disclosure.

FIG. 5 is a structure block diagram of another information transmission device according to an embodiment of the present disclosure. As shown in FIG. 5, the device includes:

a transmitting module 50, configured to transmit a PDCCH transmitted to UE; and a receiving module 52, configured to receive, according to the PDCCH, CSI transmitted by the UE.

In at least one exemplary implementation of the embodiment, the PDCCH is an uplink grant PDCCH or a downlink allocation PDCCH.

It is to be noted that each module may be implemented through software or hardware and, under the latter condition, may be implemented in, but not limited to, the following manner: the modules are all positioned in the same processor, or the modules are positioned in different processors in any combination form respectively.

Embodiment 3

The embodiment is an exemplary embodiment of the present application, and is adopted to describe the present application in combination with exemplary implementation modes in detail.

Based on the problem in the related art that periodic CSI reporting may cause unnecessary uplink overheads, the embodiment provides a PDCCH-scheduling-based aperiodic CSI reporting manner. The aperiodic CSI reporting solution is described with an NB-IoT system an example.

The embodiment includes the following implementation modes.

Implementation Mode 1

In the implementation mode, a base station transmits data of an uplink grant PDCCH to UE, and the UE receives the data of the uplink grant PDCCH from the base station. The uplink grant PDCCH adopts a downlink control information format N0, and is configured to schedule the UE to perform data transmission in a Physical Uplink Shared Channel (PUSCH) format 1 or configured to schedule the UE to perform CSI transmission. In such case, a magnitude of a payload (also called downlink control information) of the uplink grant PDCCH which schedules the UE to perform CSI transmission is the same as a magnitude of a payload of the uplink grant PDCCH which schedules data transmission in the PUSCH format 1.

In the embodiment, transmission includes sending and/or receiving.

Detailed descriptions will be made below through exemplary examples.

Example 1: in the example, all fields contained in the uplink grant PDCCH which schedules CSI transmission are the same as those contained in the uplink grant PDCCH which schedules data transmission in the PUSCH format 1, and the base station indicates a function (whether to schedule transmission in the PUSCH format 1 or to schedule CSI transmission) of the uplink grant PDCCH through a subcarrier indication field contained in the uplink grant PDCCH.

TABLE 1

| Field | Size |
|---|---|
| Format N0/format N1 identification | 1 bit |
| Subcarrier indication | 6 bits |
| Resource allocation | 3 bits |
| Scheduling delay | 2 bits |
| Modulation and coding scheme | 4 bits |
| Redundancy version | 1 bit |
| Repeat count | 3 bits |
| New data indicator | 1 bit |
| Downlink control information repeat count | 2 bits |
| HARQ process number | 1 bit |
| Bit number | 24 |

In the example, all the fields contained in the uplink grant PDCCH are shown in Table 1.

When uplink data transmission is performed based on a subcarrier spacing 3.75 kHz, if first two bits of the subcarrier indication field take a value of 11, it is indicated that the uplink grant PDCCH is configured to schedule CSI transmission (equivalent to triggering the UE to perform CSI reporting), and in such case, the last four bits of the subcarrier indication field are configured to indicate a subcarrier that is allocated (for CSI transmission); and if the first two bits of the subcarrier indication field take a value other than 11, it is indicated that the uplink grant PDCCH is configured to schedule transmission in the PUSCH format 1 (equivalent to triggering the UE to perform data transmission in the PUSCH format 1), and in such case, all of the six bits of the subcarrier indication field are configured to indicate the subcarrier that is allocated (for the PUSCH format 1).

When the uplink grant PDCCH is configured to schedule CSI transmission (namely the first two bits of the subcarrier indication field take a value of 11), since the subcarrier spacing 3.75 kHz corresponds to 48 subcarriers, when a single subcarrier that is allocated (for CSI transmission) is indicated through the last four bits of the subcarrier indication field, the last four bits is not able to represent any single subcarrier in the 48 subcarriers. Therefore, subcarriers that are allowed to be allocated are required to be limited, for example, it may be limited that eight continuous subcarriers close to an upper sideband and eight continuous subcarriers close to a lower sideband (totally 16 subcarriers) are subcarriers that are allowed to be allocated. Alternatively, the single subcarrier that is allocated may be jointly indicated through the last four bits of the subcarrier indication field and two bits contained in another field (for example, first two bits contained in a modulation and coding scheme field or one bit contained in a redundancy version field plus one bit contained in a new data indicator field).

When the uplink grant PDCCH is configured to schedule the UE to perform CSI transmission, at least one of resource allocation, modulation and coding scheme, redundancy version, new data indicator and HARQ process number fields may be configured to indicate a CSI reporting mode. If all or part of bits in the resource allocation, modulation and coding scheme, redundancy version, new data indicator or HARQ process number field are not configured to indicate any information, these bits may be used as reserved bits or used for virtual Cyclic Redundancy Check (CRC).

When the uplink grant PDCCH is configured to schedule CSI transmission, if the resource allocation field is configured to indicate the number of resource units allocated for CSI transmission, a value range of the field is the same as or different from that when the uplink grant PDCCH is configured to schedule data in the PUSCH format 1. For example, there is made such a hypothesis that the value range of the resource allocation field is {1, 2, 3, 4, 5, 6, 8, 10} (representing the number of the allocated resource units) when the uplink grant PDCCH is configured to schedule the data in the PUSCH format 1. In such case, when the uplink grant PDCCH is configured to schedule CSI transmission, the value range of the resource allocation field may reuse the abovementioned range or may be a set {1, 2, 3, 4}, and when the latter is adopted, only two bits of the resource allocation field contained in the PDCCH which schedules CSI transmission are used and the other one bit is reserved.

When the uplink grant PDCCH is configured to schedule CSI transmission, a time-domain size of a resource unit is the same as that when the uplink grant PDCCH is configured to schedule data transmission in the PUSCH format 1 or less than the time-domain size of the resource unit when the uplink grant PDCCH is configured to schedule data transmission in the PUSCH format 1. For example, there is made such a hypothesis that the time-domain size of the resource unit is equal to 32 milliseconds when the PDCCH is configured to schedule data transmission in the PUSCH format 1, and in such case, when the uplink grant PDCCH is configured to schedule CSI transmission, the time-domain size of the resource unit may be 32 milliseconds or 16 milliseconds.

When the uplink grant PDCCH is configured to schedule CSI transmission, a value range of a repeat count field is the same as or different from that when the PDCCH is configured to schedule the data in the PUSCH format 1. For example, there is made such a hypothesis that the value range of the repeat count field is {1, 2, 4, 8, 16, 32, 64, 128} when the uplink grant PDCCH is configured to schedule the data in the PUSCH format 1. In such case, when the uplink grant PDCCH is configured to schedule CSI transmission, the value range of the repeat count field may reuse the abovementioned range or may be a set {1, 2, 4, 8}, and when the latter is adopted, only two bits of the field are used and the other one bit is reserved.

When the uplink grant PDCCH is configured to schedule CSI transmission, a value range of a scheduling delay field is the same as or different from that when the PDCCH is configured to schedule the data in the PUSCH format 1. For example, there is made such a hypothesis that the value range of the scheduling delay field is {8, 16, 32, 64} milliseconds when the uplink grant PDCCH is configured to schedule the data in the PUSCH format 1, then in such case, when the uplink grant PDCCH is configured to schedule CSI transmission, the value range of the scheduling delay field reuses the abovementioned range or adopts a set {16, 32, 64, 128} milliseconds, and for the latter, a maximum delay is greater than a maximum delay when the uplink grant PDCCH is configured to schedule the PUSCH format 1.

When uplink data transmission is performed based on a subcarrier spacing 15 kHz, if the first bit of the subcarrier indication field takes a value of 1, it is indicated that the uplink grant PDCCH is configured to schedule CSI transmission (equivalent to triggering the UE to perform CSI reporting), and the last five bits of the field are configured to indicate the subcarrier that is allocated (for CSI transmission); and if the first bit of the subcarrier indication field takes a value of 0, it is indicated that the uplink grant PDCCH is configured to schedule data transmission in the PUSCH format 1 (equivalent to triggering the UE for transmission in the PUSCH format 1), and the last five bits of the field are configured to indicate the subcarrier that is allocated.

When the uplink grant PDCCH is configured to schedule CSI transmission (namely the first bit of the subcarrier indication field takes a value of 1), a subcarrier number that may be indicated by the last five bits of the subcarrier indication field is the same as or different from that when the PDCCH is configured to schedule the data in the PUSCH format 1. For example, there is made such a hypothesis that the subcarrier number that is able to be indicated by the last five bits of the subcarrier indication field is 1, 3, 6 or 12 when the uplink grant PDCCH is configured to schedule the data in the PUSCH format 1. In such case, the last five bits of the subcarrier indication field may reuse the abovementioned subcarrier number or support indication of only one subcarrier. Since the subcarrier spacing 15 kHz corresponds to 12 subcarriers, when the latter is adopted, only four bits of the five bits are required to be used, and the other one bit is reserved.

When the uplink grant PDCCH is configured to schedule CSI transmission, at least one of the new data indicator, modulation and coding scheme, resource allocation, redundancy version and HARQ process number fields may be configured to indicate the CSI reporting mode. If all or part of the bits in the resource allocation, modulation and coding scheme, redundancy version, new data indicator or HARQ process number field are not configured to indicate any information, these bits may be used as reserved bits or used for virtual CRC.

When the uplink grant PDCCH is configured to schedule CSI transmission, if the resource allocation field is configured to indicate the number of the resource units allocated for CSI transmission, the value range of the field is the same as or different from that when the uplink grant PDCCH is configured to schedule data in the PUSCH format 1. For example, there is made such a hypothesis that the value range of the resource allocation field is {1, 2, 3, 4, 5, 6, 8, 10} (representing the number of the allocated resource units) when the uplink grant PDCCH is configured to schedule the data in the PUSCH format 1. In such case, when the uplink grant PDCCH is configured to schedule CSI transmission, the value range of the resource allocation field may reuse the abovementioned range or be the set {1, 2, 3, 4}, and when the latter is adopted, only two bits of the resource allocation field contained in the uplink grant PDCCH which schedules CSI transmission are used and the other one bit is reserved.

When the uplink grant PDCCH is configured to schedule CSI transmission, the time-domain size of the resource unit is the same as that when the uplink grant PDCCH is configured to schedule data transmission in the PUSCH format 1 or less than the time-domain size of the resource unit when the uplink grant PDCCH is configured to schedule data transmission in the PUSCH format 1. For example, there is made such a hypothesis that the time-domain size of the resource unit is equal to 8 milliseconds when the PDCCH is configured to schedule data transmission in the PUSCH format 1, and in such case, when the uplink grant PDCCH is configured to schedule CSI transmission, the time-domain size of the resource unit may be 8 milliseconds or 4 milliseconds.

When the uplink grant PDCCH is configured to schedule CSI transmission, the value range of the repeat count field is the same as or different from that when the uplink grant PDCCH is configured to schedule the data in the PUSCH format 1. For example, there is made such a hypothesis that the value range of the repeat count field is {1, 2, 4, 8, 16, 32, 64, 128} when the uplink grant PDCCH is configured to schedule the PUSCH format 1. In such case, when the uplink grant PDCCH is configured to schedule CSI transmission, the value range of the repeat count field may reuse the abovementioned range or be the set {1, 2, 4, 8}, and when the latter is adopted, only two bits of the field are used and the other one bit is reserved.

When the uplink grant PDCCH is configured to schedule CSI transmission, the value range of the scheduling delay field is the same as or different from that when the uplink grant PDCCH is configured to schedule the PUSCH format 1. For example, there is made such a hypothesis that the value range of the scheduling delay field is {8, 16, 32, 64} milliseconds when the uplink grant PDCCH is configured to schedule the data in the PUSCH format 1. In such case, when the uplink grant PDCCH is configured to schedule CSI transmission, the value range of the scheduling delay field reuses the abovementioned range or adopts the set {16, 32, 64, 128} milliseconds, and for the latter, a maximum delay is greater than a maximum delay when the uplink grant PDCCH schedules the PUSCH format 1.

Example 2: in the example, all fields contained in the uplink grant PDCCH which schedules CSI transmission are the same as those contained in the uplink grant PDCCH which schedules data in the PUSCH format 1, and the base station indicates a function (whether to schedule CSI transmission or to schedule data transmission in the PUSCH format 1) of the present uplink grant PDCCH through a modulation and coding scheme field.

In the example, all the fields contained in the uplink grant PDCCH are shown in Table 1.

The function of the uplink grant PDCCH is indicated through the modulation and coding scheme field in the following manners.

A first manner: if four bits of the modulation and coding scheme field take a value of 1110, it is indicated that the uplink grant PDCCH is configured to schedule CSI transmission (equivalent to triggering the UE to perform CSI reporting); and if the four bits of the modulation and coding scheme field take a value less than 1110, it is indicated that the present uplink grant PDCCH is configured to schedule data transmission in the PUSCH format 1 (equivalent to triggering the UE to perform data transmission in the PUSCH format 1).

A second manner: if the four bits of the modulation and coding scheme field take a value of 1111, it is indicated that the uplink grant PDCCH is configured to schedule CSI transmission (equivalent to triggering the UE to perform CSI reporting); and if the four bits of the modulation and coding scheme field take a value less than 1111, it is indicated that the present uplink grant PDCCH is configured to schedule data transmission in the PUSCH format 1 (equivalent to triggering the UE to perform data transmission in the PUSCH format 1).

A third manner: if the four bits of the modulation and coding scheme field take a value of 1110, it is indicated that the uplink grant PDCCH is configured to schedule CSI transmission (equivalent to triggering the UE to perform CSI reporting) and it is also indicated that a first CSI reporting mode is adopted; if four bits of the modulation and coding scheme field take a value of 1111, it is indicated that the uplink grant PDCCH is configured to schedule CSI transmission and it is also indicated that a second CSI reporting mode is adopted; and if four bits of the modulation and coding scheme field take a value less than 1110, it is indicated that the uplink grant PDCCH is configured to schedule transmission in the PUSCH format 1 (equivalent to triggering the UE to perform data transmission in the PUSCH format 1).

A fourth manner: if the four bits of the modulation and coding scheme field take a value of 1011, it is indicated that the uplink grant PDCCH is configured to schedule CSI transmission (equivalent to triggering the UE to perform CSI reporting) and it is also indicated that the first CSI reporting mode is adopted; if the four bits of the modulation and coding scheme field take a value of 1100, it is indicated that the uplink grant PDCCH is configured to schedule CSI transmission and it is also indicated that the second CSI reporting mode is adopted; and if the four bits of the modulation and coding scheme field take a value less than 1011, it is indicated that the uplink grant PDCCH is configured to schedule transmission in the PUSCH format 1 (equivalent to triggering the UE to perform data transmission in the PUSCH format 1).

A fifth manner: if the first three bits of the modulation and coding scheme field take a value of 111, it is indicated that the uplink grant PDCCH is configured to schedule CSI transmission (equivalent to triggering the UE to perform CSI reporting); and if the first three bits of the modulation and coding scheme field take a value other than 111, it is indicated that the present uplink grant PDCCH is configured to schedule data transmission in the PUSCH format 1 (equivalent to triggering the UE to perform data transmission in the PUSCH format 1) and all of the four bits of the modulation and coding scheme field are configured to indicate a modulation and coding scheme for data in the PUSCH format 1.

A sixth manner: when a subcarrier number indicated by a subcarrier indication field is 1, if the four bits of the modulation and coding scheme field take a value of 1011, it is indicated that the uplink grant PDCCH is configured to schedule the UE to perform CSI transmission; and if the four bits of the modulation and coding scheme field take a value less than 1011, it is indicated that the uplink grant PDCCH is configured to schedule the UE to perform data transmission in the PUSCH format 1. When the subcarrier number indicated by the subcarrier indication field is larger than 1, if the four bits of the modulation and coding scheme field take a value of 1110, it is indicated that the uplink grant PDCCH is configured to schedule the UE to perform CSI transmission; and if the four bits of the modulation and coding scheme field take a value less than 1110, it is indicated that the uplink grant PDCCH is configured to schedule the UE for transmission in the PUSCH format 1.

When the uplink grant PDCCH is configured to schedule CSI transmission and uplink data is transmitted by use of a subcarrier spacing 3.75 kHz, the subcarrier number that is able to be indicated by the subcarrier indication field is the same as that when the PDCCH is configured to schedule the data in the PUSCH format 1 (indication of only one subcarrier is supported). When the PDCCH is configured to schedule CSI transmission and the uplink data is transmitted by use of a subcarrier spacing 15 kHz, the subcarrier number that is able to be indicated by the subcarrier indication field is the same as or different from that when the PDCCH is configured to schedule the data in the PUSCH format 1. For example, there is made such a hypothesis that the subcarrier number that is able to be indicated by the subcarrier indication field is 1, 3, 6 or 12 when the PDCCH is configured to schedule the data in the PUSCH format 1. In such case, the subcarrier indication field may reuse the abovementioned subcarrier number or support allocation of only one subcarrier when the uplink grant PDCCH is configured to schedule CSI transmission. Since the subcarrier spacing 15 kHz corresponds to 12 subcarriers, when the latter is adopted, only four bits of five bits are required to be used, and the other one bit may be reserved.

When the uplink grant PDCCH is configured to schedule CSI transmission, at least one of redundancy version, resource allocation, new data indicator and HARQ process number fields may be configured to indicate the CSI reporting mode. If all or part of bits in the resource allocation, redundancy version, new data indicator or HARQ process number field are not configured to indicate any information, these bits may be used as reserved bits or used for virtual CRC.

When the uplink grant PDCCH is configured to schedule CSI transmission, if the resource allocation field is configured to indicate the number of resource units allocated for CSI transmission, a value range of the field is the same as or different from that when the uplink grant PDCCH is configured to schedule the UE to perform data transmission in the PUSCH format 1. For example, there is made such a hypothesis that the value range of the resource allocation field is {1, 2, 3, 4, 5, 6, 8, 10} (representing the number of the allocated resource units) when the uplink grant PDCCH is configured to schedule the UE for transmission in the PUSCH format 1, the value range of the resource allocation field may reuse the abovementioned range or be a set {1, 2, 3, 4} when the uplink grant PDCCH is configured to schedule CSI transmission, and for the latter, only two bits of the resource allocation field contained in the PDCCH which schedules CSI transmission are used and the other one bit is reserved.

When the uplink grant PDCCH is configured to schedule CSI transmission, a time-domain size of a resource unit is the same as that when the uplink grant PDCCH is configured to schedule data transmission in the PUSCH format 1 or less than the time-domain size of the resource unit when the uplink grant PDCCH is configured to schedule data transmission in the PUSCH format 1. For example, there is made such a hypothesis that the time-domain size of the resource unit is equal to 32 milliseconds when the uplink grant PDCCH is configured to schedule data transmission in the PUSCH format 1, and in such case, the time-domain size of the resource unit may be 32 milliseconds or 16 milliseconds when the uplink grant PDCCH is configured to schedule CSI transmission.

When the uplink grant PDCCH is configured to schedule CSI transmission, a value range of a repeat count field is the same as or different from that when the uplink grant PDCCH is configured to schedule transmission in the PUSCH format 1. For example, there is made such a hypothesis that the value range of the repeat count field is {1, 2, 4, 8, 16, 32, 64, 128} when the uplink grant PDCCH is configured to schedule transmission in the PUSCH format 1, the value range of the repeat count field may reuse the abovementioned range or be a set {1, 2, 4, 8} when the uplink grant PDCCH is configured to schedule CSI transmission, and when the latter is adopted, only two bits of the field are used and the other one bit may be reserved.

Example 3: in the example, fields contained in the uplink grant PDCCH configured to schedule CSI transmission are different from those contained in the uplink grant PDCCH which schedules transmission in the PUSCH format 1.

TABLE 2

(Subcarrier Spacing 15 kHz)

| PUSCH format 1 scheduling field | CSI transmission scheduling field |
|---|---|
| Format N0/format N1 identification (1 bit) | |
| PUSCH format 1 scheduling/CSI transmission scheduling identification (1 bit) | |
| Subcarrier indication (5 bits) | Subcarrier indication (4 bits) |
| Resource allocation (3 bits) | Scheduling delay (2 bits) |
| Scheduling delay (2 bits) | Repeat count (3 or 2 bits) |
| Modulation and coding scheme (4 bits) | Downlink control information repeat count (2 bits) |
| Redundancy version (1 bit) | CSI reporting mode (1 bit) |
| Repeat count (3 bits) | Reserved field (10 or 11 bits) |
| New data indicator (1 bit) | Bit number (24) |
| Downlink control information repeat count (2 bits) | |
| HARQ process number (1 bit) | |
| Bit number (24) | |

When uplink data transmission is performed based on a subcarrier spacing 15 kHz, all the fields contained in the uplink grant PDCCH are shown in Table 2. A second bit is configured to indicate whether the uplink grant PDCCH is configured to schedule transmission in the PUSCH format 1 or CSI transmission. If the second bit takes a value of 0, it is indicated that the uplink grant PDCCH is configured to schedule transmission in the PUSCH format 1 (equivalent to triggering the UE for transmission in the PUSCH format 1). If the second bit takes a value of 1, it is indicated that the uplink grant is configured to schedule CSI transmission (equivalent to triggering the UE to perform CSI reporting).

When the uplink grant PDCCH is configured to schedule CSI transmission, a single subcarrier is adopted for CSI transmission. Since there are 12 subcarriers, four bits are required to indicate an allocated subcarrier.

When the uplink grant PDCCH is configured to schedule CSI transmission, a value range of a scheduling delay field is the same as or different from that when the uplink grant PDCCH is configured to schedule transmission in the PUSCH format 1. For example, there is made such a hypothesis that the value range of the scheduling delay field is {8, 16, 32, 64} milliseconds when the uplink grant PDCCH is configured to schedule the PUSCH format 1, in such case, when the uplink grant PDCCH is configured to schedule CSI transmission, the value range of the scheduling delay field reuses the abovementioned range or adopts a set {16, 32, 64, 128} milliseconds, and for the latter, a maximum delay is greater than a maximum delay when the uplink grant PDCCH schedules the PUSCH format 1.

When the uplink grant PDCCH is configured to schedule CSI transmission, a value range of a repeat count field is the same as or different from that when the uplink grant PDCCH is configured to schedule transmission in the PUSCH format 1. For example, there is made such a hypothesis that the value range of the repeat count field is {1, 2, 4, 8, 16, 32, 64, 128} when the uplink grant PDCCH schedules transmission in the PUSCH format 1, and the value range of the repeat count field reuses the abovementioned range (indicated through three bits) or adopts {1, 2, 4, 8} (indicated through two bits) when the CSI transmission is scheduled.

When the uplink grant PDCCH is configured to schedule CSI transmission, a time-domain size of a resource unit is the same as that when the uplink grant PDCCH is configured to schedule the data in the PUSCH format 1 or less than the time-domain size of the resource unit when the PDCCH is configured to schedule data transmission in the PUSCH format 1. For example, there is made such a hypothesis that the time-domain size of the resource unit is equal to 32 milliseconds when the uplink grant PDCCH is configured to schedule data transmission in the PUSCH format 1, and in such case, the time-domain size of the resource unit may be 32 milliseconds or 16 milliseconds when the uplink grant PDCCH is configured to schedule CSI transmission.

TABLE 3

(Subcarrier Spacing 3.75 kHz)

| PUSCH format 1 scheduling field | CSI transmission scheduling field |
|---|---|
| Format N0/format N1 identification (1 bit) | |
| PUSCH format 1 scheduling and high-order bit for subcarrier indication/CSI transmission scheduling (2 bits) | |
| Subcarrier indication (4 low-order bits) | Subcarrier indication (6 bits) |
| Resource allocation (3 bits) | Scheduling delay (2 bits) |
| Scheduling delay (2 bits) | Repeat count (3 or 2 bits) |
| Modulation and coding scheme (4 bits) | Downlink control information repeat count (2 bits) |
| Redundancy version (1 bit) | CSI reporting mode (1 bit) |
| Repeat count (3 bits) | Reserved field (7 or 8 bits) |
| New data indicator (1 bit) | Bit number (24) |
| Downlink control information repeat count (2 bits) | |
| HARQ process number (1 bit) | |
| Bit number (24) | |

When uplink data transmission is performed based on a subcarrier spacing 3.75 kHz, all the fields contained in the uplink grant PDCCH are shown in Table 3. The second and third bits indicate whether the present uplink grant PDCCH is configured to schedule data transmission in the PUSCH format 1 or configured to schedule CSI transmission. When the PDCCH is configured to schedule data transmission in the PUSCH format 1, the two bits are further configured to allocate a subcarrier for transmission in the PUSCH format 1. Specifically, if the two bits take a value of 11, it is indicated that the present uplink grant PDCCH is configured to schedule CSI transmission (equivalent to triggering the UE to perform CSI transmission); and if the two bits take a value other than 11, it is indicated that the uplink grant PDCCH is configured to schedule data transmission in the PUSCH format 1 (equivalent to triggering the UE to perform data transmission in the PUSCH format 1), and meanwhile, the two bits (high-order bits) and four bits (low-order bits) in a subcarrier indication field jointly indicate the subcarrier allocated for transmission in the PUSCH format 1.

When the uplink grant PDCCH is configured to schedule CSI transmission, a single subcarrier is adopted for CSI transmission. Since there are 48 subcarriers, six bits are required to indicate the allocated subcarrier.

When the uplink grant PDCCH is configured to schedule CSI transmission, the value range of the scheduling delay field is the same as or different from that when the uplink grant PDCCH is configured to schedule data transmission in the PUSCH format 1. For example, there is made such a hypothesis that the value range of the scheduling delay field is {8, 16, 32, 64} milliseconds when the uplink grant PDCCH is configured to schedule data transmission in the PUSCH format 1, the value range of the scheduling delay field reuses the abovementioned range or adopts the set {16, 32, 64, 128} milliseconds when the PDCCH is configured to schedule CSI transmission, and for the latter, the maximum delay is greater than the maximum delay when the uplink grant PDCCH schedules the PUSCH format 1.

When the uplink grant PDCCH is configured to schedule CSI transmission, the value range of the repeat count field is the same as or different from that when the uplink grant PDCCH is configured to schedule data transmission in the PUSCH format 1. For example, there is made such a hypothesis that the value range of the repeat count field is {1, 2, 4, 8, 16, 32, 64, 128} when the uplink grant PDCCH is configured to schedule data transmission in the PUSCH format 1, and in such case, the value range of the repeat count field reuses the abovementioned range (indicated through three bits) or adopts {1, 2, 4, 8} (indicated through two bits) when the uplink grant is configured to schedule CSI transmission.

When the uplink grant PDCCH is configured to schedule CSI transmission, a time-domain size of a resource unit is the same as that when the uplink grant PDCCH is configured to schedule data transmission in the PUSCH format 1 or less than the time-domain size of the resource unit when the uplink grant PDCCH is configured to schedule data transmission in the PUSCH format 1. For example, there is made such a hypothesis that the time-domain size of the resource unit is equal to 8 milliseconds when the PDCCH is configured to schedule the data in the PUSCH format 1, and in such case, the time-domain size of the resource unit may be 8 milliseconds or 4 milliseconds when the uplink grant PDCCH is configured to schedule CSI transmission.

In the NB-IoT system, the PDSCH is configured to bear a downlink service.

Two manners may be adopted for PDSCH transmission.

A first manner: the PDSCH is only allowed to be scheduled through the same carrier.

In such case, the PDSCH is always transmitted in a carrier transmitting the PDCCH.

A second manner: cross-carrier scheduling of the PDSCH is allowed. In such case, the PDSCH is transmitted in the carrier transmitting the PDCCH or a carrier not transmitting the PDCCH. The base station configures all carriers allowed for PDSCH transmission for the UE through a field contained in a UE-specific RRC message, and the carrier transmitting the PDCCH is one of all the carriers allowed for PDSCH transmission. The specific carrier that is the carrier transmitting the PDCCH in all the carriers allowed for PDSCH transmission may be preset (for example, it is the first carrier in all the carriers allowed for PDSCH transmission by default) or configured by the base station.

In the implementation mode, when the PDSCH is only allowed to be scheduled through the same carrier, a subframe for CSI measurement of the UE may be one of: (1) all or part of subframes in a downlink subframe set transmitting the uplink grant PDCCH; and (2), all or part of subframes in a downlink subframe set between the end of uplink grant PDCCH transmission and the start of CSI transmission (i.e., all or part of subframes during a scheduling delay). The number of the subframe for CSI measurement (called a measurement subframe for short) may be configured by the base station.

When cross-carrier scheduling of the PDSCH is allowed, the CSI includes one of:

CSI of the carrier transmitting the uplink grant PDCCH;

CSI of a carrier with best channel quality in a measurement carrier set;

CSI of a specified carrier in the measurement carrier set, wherein the base station configures the specific carrier that is the specified carrier in the measurement carrier set for the UE through the field contained in the UE-specific RRC message or the uplink grant PDCCH, and when the base station configures it through the field contained in the uplink grant PDCCH, the field may be all or part of bits of at least one of the modulation and coding scheme, resource allocation, redundancy version, new data indicator and HARQ process number fields in Table 1 in the implementation mode or a newly added field in Table 2 or Table 3 in the implementation mode; and CSI of all carriers in the measurement carrier set, wherein, in such case, the time-domain size of the resource unit corresponding to CSI transmission is different from the time-domain size of the resource unit corresponding to CSI transmission when the PDSCH is only allowed to be scheduled through the same carrier. For example, there is made such a hypothesis that uplink data transmission is performed based on the subcarrier spacing 15 kHz, and if the time-domain size of the resource unit corresponding to CSI transmission when the PDSCH is only allowed to be scheduled through the same carrier is 8 milliseconds, the time-domain size of the resource unit corresponding to CSI transmission when cross-carrier scheduling of the PDSCH is allowed is 16 milliseconds (namely the time-domain size of the resource unit when cross-carrier scheduling is allowed is an integral multiple of the time-domain size of the resource unit when the PDSCH is only allowed to be scheduled through the same carrier).

The measurement carrier set is a set formed by all the carriers allowed for PDSCH transmission (a cross-carrier scheduling carrier set); or, the measurement carrier set is a carrier set different from the cross-carrier scheduling carrier set, and the base station configures it for the UE through the UE-specific RRC message.

When the CSI is the CSI of the carrier transmitting the uplink grant PDCCH, the subframe for CSI measurement of the UE is one of: all or part of the subframes in the downlink subframe set transmitting the uplink grant PDCCH and all or part of the subframes in the downlink subframe between the end of uplink grant PDCCH transmission and the start of CSI transmission. When the CSI is not the CSI of the carrier transmitting the uplink grant PDCCH, the subframe for CSI measurement of the UE is all or part of the subframes in the downlink subframe set between the end of uplink grant PDCCH transmission and the start of CSI transmission. The base station may configure the number of the subframe for CSI measurement (measurement subframe) through the UE-specific RRC message.

When the CSI is the CSI of the carrier with the best channel quality in the measurement carrier set or the CSI of all the carriers in the measurement carrier set, the value range of the scheduling delay field contained in the uplink grant PDCCH configured to schedule the UE to perform CSI transmission is different from the value range of the scheduling delay field contained when the PDSCH is only allowed to be scheduled through the same carrier. For example, if the value range of a scheduling delay is {8, 16, 32, 64} milliseconds when the PDSCH is only allowed to be scheduled through the same carrier, the value range of the scheduling delay may be {16, 32, 64, 128} when cross-carrier scheduling of the PDSCH is allowed (namely a maximum delay when cross-carrier scheduling of the PDSCH is allowed is greater than a maximum delay when the PDSCH is only allowed to be scheduled through the same carrier).

In the implementation mode, the base station may schedule the UE to perform CSI transmission by use of the uplink grant PDCCH, the magnitude of the payload of the uplink grant PDCCH which schedules the UE to perform CSI transmission being the same as the magnitude of the payload of the uplink grant PDCCH which schedules the UE to perform data transmission in the PUSCH format 1. Adopting the method has the advantages that the UE may report the CSI to the base station before the PDSCH is transmitted and increase of the maximum number of times of PDCCH detection of the UE is avoided.

Implementation Mode 2

In the implementation mode, a base station transmits data of an uplink grant PDCCH to UE, and the UE receives the data of the uplink grant PDCCH from the base station. The uplink grant PDCCH adopts a downlink control information format N0 to schedule the UE to perform data transmission in a PUSCH format 1 and adopts an information format (represented as Nx) different from the downlink control information format N0 to schedule the UE to perform CSI transmission. A magnitude of a payload of the uplink grant PDCCH which schedules the UE to perform CSI transmission is different from that of the uplink grant PDCCH which schedules the UE to perform data transmission in the PUSCH format 1.

In the implementation mode, the magnitude of the payload of the uplink grant PDCCH is configured to indicate whether the uplink grant PDCCH is configured to schedule the UE to perform data transmission in the PUSCH format 1 or to perform CSI transmission. If the magnitude of the payload of the uplink grant PDCCH is a first value (corresponding to the downlink control information format N0), it is indicated that the uplink grant PDCCH is configured to schedule transmission in the PUSCH format 1 (equivalent to triggering the UE for transmission in the PUSCH format 1). If the magnitude of the payload of the uplink grant PDCCH is a second value (corresponding to the downlink control information format Nx), it is indicated that the uplink grant PDCCH is configured to schedule CSI transmission (equivalent to triggering the UE to perform CSI transmission).

As an example, fields contained in the uplink grant PDCCH which schedules the UE to perform CSI transmission are shown in Table 4. A single subcarrier is adopted for CSI transmission. When uplink data transmission is performed based on a subcarrier spacing 15 kHz, there are totally 12 subcarriers, so that four bits are required to indicate an allocated subcarrier. When uplink data transmission is performed based on a subcarrier spacing 3.75 kHz, there are totally 48 subcarriers, six bits are required to indicate the allocated subcarrier.

TABLE 4

| Field | Subcarrier spacing 15 kHz | Subcarrier spacing 3.75 kHz |
|---|---|---|
| Subcarrier indication | 4 bits | 6 bits |
| Scheduling delay | 2 bits | 2 bits |

TABLE 4-continued

| Field | Subcarrier spacing 15 kHz | Subcarrier spacing 3.75 kHz |
|---|---|---|
| Repeat count | 3 or 2 bits | 3 or 2 bits |
| Downlink control information repeat count | 2 bits | 2 bits |
| CSI reporting mode | 1 bit | 1 bit |
| Reserved field | 4 bits | 2 bits |
| Bit number | 16 or 15 | |

A value range of a scheduling delay field is the same as or different from that when the uplink grant PDCCH is configured to schedule the UE to perform data transmission in the PUSCH format 1. For example, there is made such a hypothesis that the value range of the scheduling delay field is {8, 16, 32, 64} milliseconds when the uplink grant PDCCH is configured to schedule transmission in the PUSCH format 1. In such case, the value range of the scheduling delay field reuses the abovementioned range or adopts {16, 32, 64, 128} milliseconds when the UE is schedules for CSI transmission in the example, and for the latter, a maximum delay is greater than a maximum delay when the uplink grant PDCCH schedules the PUSCH format 1.

A value range of a repeat count field is the same as or different from that when the uplink grant PDCCH is configured to schedule the UE to perform data transmission in the PUSCH format 1. For example, there is made such a hypothesis that the value range of the repeat count field is {1, 2, 4, 8, 16, 32, 64, 128} when the uplink grant PDCCH is configured to schedule transmission in the PUSCH format 1, and the value range of the repeat count field reuses the abovementioned range (indicated through three bits) or adopts {1, 2, 4, 8} (indicated through two bits) when the UE is scheduled for CSI transmission in the example.

When the uplink grant PDCCH is configured to schedule CSI transmission, a time-domain size of a resource unit is the same as that when the uplink grant PDCCH is configured to schedule data transmission in the PUSCH format 1 or less than the time-domain size of the resource unit when the uplink grant PDCCH is configured to schedule data transmission in the PUSCH format 1. For example, there is made such a hypothesis that the time-domain size of the resource unit is equal to 32 milliseconds when the uplink grant PDCCH is configured to schedule transmission in the PUSCH format 1, and in such case, the time-domain size of the resource unit may be 32 milliseconds or 16 milliseconds when the uplink grant PDCCH is configured to schedule CSI transmission.

In the implementation mode, a subframe for CSI measurement is the same as that in implementation mode 1.

In the implementation mode, the base station may schedule the UE to perform CSI transmission by use of the uplink grant PDCCH, the magnitude of the payload of the uplink grant PDCCH which schedules CSI transmission being different from the magnitude of the payload of the uplink grant PDCCH which schedules data in the PUSCH format 1. Adopting the method has the advantages that the UE may report the CSI to the base station before the PDSCH is transmitted and it is ensured that an overhead of the PDCCH configured to schedule CSI transmission is reduced to the minimum.

Implementation Mode 3

In the implementation mode, a base station transmits data of a downlink allocation PDCCH to UE, and the UE receives the data of the downlink allocation PDCCH from the base station. The downlink allocation PDCCH adopts a downlink control information format N1, and is configured to schedule the UE for PDSCH and {HARQ-ACK feedback, CSI} transmission or configured to schedule the UE for PDSCH and HARQ-ACK feedback transmission. A magnitude of a payload of the downlink allocation PDCCH which schedules the UE to perform PDSCH data and {HARQ-ACK feedback, CSI} transmission is the same as a magnitude of a payload of the downlink allocation PDCCH which schedules the UE to perform PDSCH data and HARQ-ACK feedback transmission.

Detailed descriptions will be made below through exemplary examples.

Example 1: the base station indicates through a UE-specific RRC message that the downlink allocation PDCCH is configured to schedule the UE to perform PDSCH data and {HARQ-ACK feedback, CSI} transmission or configured to schedule the UE to perform PDSCH data and HARQ-ACK feedback transmission.

The method is equivalent to that the base station indicates whether a function of the downlink allocation PDCCH includes scheduling the UE to perform CSI transmission or not through the UE-specific RRC message, or, is equivalent to that the base station triggers the UE whether to perform CSI transmission or not through the UE-specific RRC message.

When the base station indicates through a field in the UE-specific RRC message that the downlink allocation PDCCH is configured to schedule the UE to perform PDSCH data and {HARQ-ACK feedback, CSI} transmission, the base station further configures a CSI reporting mode for the UE through the field contained in the UE-specific RRC message.

TABLE 5

| Field contained in downlink allocation PDCCH which schedules PDSCH and HARQ-ACK feedback transmission | Field contained in downlink allocation PDCCH which schedules PDSCH and {HARQ-ACK feedback, CSI} transmission |
|---|---|
| Format N0, format N1 distinguished identification (1 bit) | |
| PDCCH command indicator (1 bit) | |
| Scheduling delay (3 bits) | |
| Resource allocation (3 bits) | |
| Modulation and coding scheme (4 bits) | |
| Repeat count (4 bits) | |
| New data indicator (1 bit) | |
| Downlink control information repeat count (2 bits) | |
| HARQ process number (1 bit) | |
| HARQ-ACK resource (4 bits) | {HARQ-ACK, CSI} resource (4 bits) |
| Bit number (24) | Bit number (24) |

In the example, fields contained in the downlink allocation PDCCH are shown in Table 5.

A HARQ-ACK resource field (four bits) is configured to indicate a resource transmitting a HARQ-ACK feedback. When uplink data transmission is performed based on a subcarrier spacing 3.75 kHz, a subcarrier number for transmission of the HARQ-ACK feedback is 1 by default (corresponding to a Single tone transmission mode), a subcarrier position for transmission of the HARQ-ACK feedback is indicated through three bits, a time-domain offset for transmission of the HARQ-ACK feedback is indicated through one bit, and a time-domain size of a resource unit corresponding to the HARQ-ACK feedback is 8 milliseconds. When uplink data transmission is performed based on a subcarrier spacing 15 kHz, the subcarrier number for transmission of the HARQ-ACK feedback is 1 by default, the subcarrier position for transmission of the HARQ-ACK feedback is indicated through two bits, the time-domain offset for transmission of the HARQ-ACK feedback is indicated through two bits, and the time-domain size of the resource unit corresponding to the HARQ-ACK feedback is 2 milliseconds. The base station configures a repeated transmission count of the HARQ-ACK feedback through the UE-specific RRC message.

When uplink data transmission is performed based on the subcarrier spacing 3.75 kHz, a subcarrier transmitting the HARQ-ACK feedback is one of eight subcarriers (subcarrier indexes are 38 to 45), and the time-domain offset is one of {0, 8} milliseconds. When uplink data transmission is performed based on the subcarrier spacing 15 kHz, the subcarrier transmitting the HARQ-ACK feedback is one of four subcarriers (subcarrier indexes are 0 to 3), and the time-domain offset is one of {0, 2, 4, 5} milliseconds.

It is to be noted that, unless otherwise specified, the time-domain offset in the implementation mode is the 12th millisecond after PDSCH transmission is ended or an ending moment of a 12th downlink subframe.

When the downlink allocation PDCCH is configured to schedule the UE to perform PDSCH data and {HARQ-ACK feedback, CSI} transmission, {HARQ-ACK feedback, CSI} is transmitted in one of the following manners.

A first manner: joint coding is adopted for the HARQ-ACK feedback and CSI.

One of the following coding manners is adopted for joint coding:

a first bit in the payload is occupied by the HARQ-ACK feedback, other bits are occupied by the CSI, and Binary Phase Shift Keying (BPSK) or Quadrature Phase Shift Keying (QPSK) modulation is adopted for the payload after channel coding; and the HARQ-ACK feedback is represented with one BPSK or QPSK modulation symbol and is contained in a Demodulation Reference Signal (DMRS), while the CSI is carried as a payload of uplink data, and BPSK or QPSK modulation is adopted for the payload after channel coding.

A {HARQ-ACK feedback, CSI} resource field is configured to indicate a resource transmitting the {HARQ-ACK feedback, CSI}. When uplink data transmission is performed based on the subcarrier spacing 3.75 kHz, a subcarrier number for transmission of the {HARQ-ACK feedback, CSI} is 1 by default (corresponding to the Single tone transmission mode), a subcarrier position for transmission of the {HARQ-ACK feedback, CSI} is indicated through three bits, a time-domain offset for transmission of the {HARQ-ACK feedback, CSI} is indicated through one bit, and a time-domain size of a resource unit corresponding to the {HARQ-ACK feedback, CSI} is 32 milliseconds (quadruple of the time-domain size of the resource unit corresponding to the HARQ-ACK feedback). The base station may configure a repeated transmission count corresponding to the {HARQ-ACK feedback, CSI} for the UE through the UE-specific RRC message.

A subcarrier transmitting the {HARQ-ACK feedback, CSI} is one of eight subcarriers (indexes are 38 to 45), and the time-domain offset is one of {0, 8} or {0, 32} milliseconds (for the latter, a maximum value of the time-domain offset is greater than a maximum value of the time-domain offset for transmission of the HARQ-ACK feedback).

When uplink data transmission is performed based on the subcarrier spacing 15 kHz, the subcarrier number for transmission of the {HARQ-ACK feedback, CSI} is 1 by default (corresponding to the Single tone transmission mode), a position of a single subcarrier transmitting the {HARQ-ACK feedback, CSI} is indicated through two bits, the time-domain offset for transmission of the {HARQ-ACK feedback, CSI} is indicated through two bits, and the time-domain size of the resource unit corresponding to the {HARQ-ACK feedback, CSI} is 8 milliseconds (quadruple of the time-domain size of the resource unit corresponding to the HARQ-ACK feedback); or, the subcarrier number for transmission of the {HARQ-ACK feedback, CSI} is 3 (corresponding to a Multi-tones mode), positions of three subcarriers transmitting the {HARQ-ACK feedback, CSI} are indicated through two bits, the time-domain offset for transmission of the {HARQ-ACK feedback, CSI} is indicated through two bits, and the time-domain size of the resource unit corresponding to the {HARQ-ACK feedback, CSI} is 4 milliseconds (greater than the time-domain size of the resource unit corresponding to the HARQ-ACK feedback). The repeated transmission count of the {HARQ-ACK feedback, CSI} is configured for the UE through the UE-specific RRC message.

During transmission in the Single tone mode, the subcarrier transmitting the {HARQ-ACK feedback, CSI} is one of four subcarriers (indexes are 0 to 3), and the time-domain offset is one of {0, 2, 4, 5} or {0, 8, 16, 20} milliseconds (for the latter, the maximum value of the time-domain offset is greater than the maximum value of the time-domain offset for transmission of the HARQ-ACK feedback). During transmission in the Multi-tones mode, the first subcarrier in the three subcarriers transmitting the {HARQ-ACK feedback, CSI} is one of four subcarriers (indexes are 0 to 3), and the time-domain offset is one of {0, 2, 4, 5} or {0, 4, 8, 10} milliseconds (for the latter, the maximum value of the time-domain offset is greater than the maximum value of the time-domain offset for transmission of the HARQ-ACK feedback).

The subcarrier number for transmission of the HARQ-ACK feedback is also called a frequency-domain size of the resource unit corresponding to the HARQ-ACK feedback. The subcarrier number for transmission of the {HARQ-ACK feedback, CSI} is also called a frequency-domain size of the resource unit corresponding to the {HARQ-ACK feedback, CSI}.

A second manner: resource time-division multiplexing is adopted for the HARQ-ACK feedback and the CSI.

For example, the HARQ-ACK feedback is transmitted at first, and the CSI is transmitted after the transmission of the HARQ-ACK feedback is completed. The {HARQ-ACK feedback, CSI} resource field (four bits) is configured to indicate a resource transmitting the HARQ-ACK feedback and the CSI. When uplink data transmission is performed based on the subcarrier spacing 3.75 kHz, a subcarrier number for transmission of the HARQ-ACK feedback and the CSI is 1 (corresponding to the Sine tone transmission mode), a subcarrier position for transmission of the HARQ-ACK feedback and the CSI is indicated through three bits (namely the HARQ-ACK feedback and the CSI are transmitted through the same subcarrier), a time-domain offset for transmission of the HARQ-ACK feedback and the CSI is indicated through one bit (the HARQ-ACK feedback is transmitted at first, so the time-domain offset is equal to the time-domain offset corresponding to transmission of the HARQ-ACK feedback), a time-domain size of a resource unit corresponding to the HARQ-ACK feedback is 8 milliseconds, and a time-domain size of the resource unit corresponding to the CSI is 32 milliseconds (quadruple of the time-domain size of the resource unit corresponding to the HARQ-ACK feedback that is transmitted at first). When uplink data transmission is performed based on the subcarrier spacing 15 kHz, the subcarrier number for transmission of the HARQ-ACK feedback and the CSI is 1 by default, the subcarrier position for transmission of the HARQ-ACK feedback and the CSI is indicated through two bits, the time-domain offset for transmission of the HARQ-ACK feedback and the CSI is indicated through one bit, the time-domain size of the resource unit corresponding to the HARQ-ACK feedback is 2 milliseconds, and the time-domain size of the resource unit corresponding to the CSI is 8 milliseconds (quadruple of the time-domain size of the resource unit corresponding to the HARQ-ACK feedback that is transmitted at first). The same repeated transmission count is adopted for the HARQ-ACK feedback and the CSI, and the base station configures the repeated transmission count of the HARQ-ACK feedback and the CSI for the UE through the UE-specific RRC message. It is to be noted that the subcarrier number for transmission of the HARQ-ACK feedback and the CSI is also called a frequency-domain size of the resource unit corresponding to transmission of the HARQ-ACK feedback and the CSI.

When uplink data transmission is performed according to the spacing 3.75 kHz, a subcarrier for transmitting the HARQ-ACK feedback and the CSI is one of eight subcarriers (subcarrier indexes are 38 to 45), and the corresponding time-domain offset is one of {0, 8} milliseconds. When uplink data transmission is performed according to the spacing 15 kHz, the subcarrier transmitting the HARQ-ACK feedback and the CSI is one of four subcarriers (subcarrier indexes are 0 to 3), and the corresponding time-domain offset is one of {0, 2, 4, 5} milliseconds.

Example 2: the base station specifically indicates whether the downlink allocation PDCCH is configured to schedule the UE for PDSCH and {HARQ-ACK feedback, CSI} transmission or configured to schedule the UE for PDSCH and HARQ-ACK feedback transmission through a field contained in the downlink allocation PDCCH. The method is equivalent to that the base station indicates whether a function of the downlink allocation PDCCH includes scheduling the UE to perform CSI transmission or not through the field contained in the downlink allocation PDCCH, or, is equivalent to that the base station triggers the UE whether to perform CSI transmission or not through the field contained in the downlink allocation PDCCH.

TABLE 6

| Field contained in downlink allocation PDCCH which schedules PDSCH and HARQ-ACK feedback | Field contained in downlink allocation PDCCH which schedules PDSCH and {HARQ-ACK feedback, CSI} transmission |
|---|---|
| Format N0, format N1 distinguished identification (1 bit) | |
| PDCCH command indicator (1 bit) | |
| Scheduling delay (3 bits) | |
| Resource allocation (3 bits) | |
| Modulation and coding scheme (4 bits) | |
| Repeat count (4 bits) | |
| New data indicator (1 bit) | |
| Downlink control information repeat count (2 bits) | |
| HARQ process number (1 bit) | |
| HARQ-ACK feedback scheduling/{HARQ-ACK feedback, CSI} scheduling identification (1 bit) | |
| HARQ-ACK resource (4 bits) | {HARQ-ACK, CSI} resource (4 bits) |
| Reserved (1 bit) | CSI reporting mode (1 bit) |
| Bit number (26) | Bit number (26) |

In the example, fields contained in the downlink allocation PDCCH are shown in Table 6.

If a value of a HARQ-ACK feedback scheduling/{HARQ-ACK feedback, CSI} scheduling identification field is 0, it is indicated that the present downlink allocation PDCCH is configured to schedule the UE to perform PDSCH data and HARQ-ACK feedback transmission (equivalent to triggering the UE for HARQ-ACK feedback transmission). If the value of the HARQ-ACK feedback scheduling/{HARQ-ACK feedback, CSI} scheduling identification field is 1, it is indicated that the downlink allocation PDCCH is configured to schedule PDSCH data and {HARQ-ACK feedback, CSI} transmission (equivalent to triggering the UE for {HARQ-ACK feedback, CSI} transmission).

In the example, when the downlink allocation PDCCH is configured to schedule the UE to perform PDSCH data and {HARQ-ACK feedback, CSI} transmission, a definition of a {HARQ-ACK feedback, CSI} resource field and a transmission manner for {HARQ-ACK feedback, CSI} are the same as those in example 1.

Example 3: the base station implicitly indicates whether the downlink allocation PDCCH is configured to schedule the UE for PDSCH and {HARQ-ACK feedback, CSI} transmission or configured to schedule the UE for PDSCH and HARQ-ACK feedback transmission through a PDSCH transmission related field contained in the downlink allocation PDCCH (equivalent to that the base station indicates whether a function of the downlink allocation PDCCH includes scheduling the UE to perform CSI transmission or not through the PDSCH transmission related field, or, equivalent to that the base station triggers the UE whether to perform CSI transmission or not through the PDSCH transmission related field).

TABLE 7

| Field contained in downlink allocation PDCCH which schedules PDSCH and HARQ-ACK feedback | Field contained in downlink allocation PDCCH which schedules PDSCH and {HARQ-ACK feedback, CSI} transmission |
|---|---|
| Format N0/format N1 distinguished identification (1 bit) | |
| PDCCH command indicator (1 bit) | |
| Scheduling delay (3 bits) | |
| Resource allocation (3 bits) | |
| Modulation and coding scheme (4 bits) | |
| Repeat count (4 bits) | |
| New data indicator (1 bit) | |
| Downlink control information repeat count (2 bits) | |
| HARQ process number (1 bit) | |
| HARQ-ACK resource (4 bits) | {HARQ-ACK, CSI} resource (4 bits) |
| Bit number (24) | Bit number (24) |

In the example, the base station configures a CSI reporting mode through a UE-specific RRC message.

In the example, fields contained in the downlink allocation PDCCH are shown in Table 7.

If a value of a new data indicator field is 0 (indicating first transmission of the PDSCH), it is indicated that the downlink allocation PDCCH is configured to schedule the UE to perform PDSCH data and HARQ-ACK feedback transmission. If the value of the new data indicator field is 1 (indicating retransmission of the PDSCH), it is indicated that the downlink allocation PDCCH is configured to schedule the UE to perform PDSCH data and {HARQ-ACK feedback, CSI} transmission.

In the example, when the downlink allocation PDCCH is configured to schedule the UE to perform PDSCH data and {HARQ-ACK feedback, CSI} transmission, a definition of a {HARQ-ACK feedback, CSI} resource field and a transmission manner for {HARQ-ACK feedback, CSI} are the same as those in example 1.

In example 1, example 2 and example 3 of the implementation mode, the base station configures the CSI reporting mode for the UE through a field contained in the UE-specific RRC message.

Two manners may be adopted for PDSCH transmission.

A first manner: the PDSCH is only allowed to be scheduled through the same carrier.

In such case, the PDSCH is always transmitted in a carrier transmitting the PDCCH.

A second manner: cross-carrier scheduling of the PDSCH is allowed. In such case, the PDSCH is transmitted in the carrier transmitting the PDCCH or a carrier not transmitting the PDCCH. The base station configures all carriers allowed for PDSCH transmission for the UE through the field contained in the UE-specific RRC message, and the carrier transmitting the PDCCH is one of all the carriers allowed for PDSCH transmission. The specific carrier that is the carrier transmitting the PDCCH in all the carriers allowed for PDSCH transmission may be preset (for example, it is the first carrier in all the carriers allowed for PDSCH transmission by default) or configured by the base station.

In the implementation mode, when the PDSCH is only allowed to be scheduled through the same carrier, a subframe for CSI measurement of the UE may be one of: (1) all or part of subframes in a downlink subframe set transmitting the PDSCH; and (2) all or part of subframes in a downlink subframe set between the end of PDSCH transmission and the start of {HARQ-ACK feedback, CSI} transmission. The base station configures the number of the subframe for CSI measurement of the UE (measurement subframe) through the UE-specific RRC message.

When cross-carrier scheduling of the PDSCH is allowed, the CSI includes one of:

CSI of the carrier transmitting the downlink allocation PDCCH;

CSI of a carrier transmitting the PDSCH;

CSI of a carrier with best channel quality in a measurement carrier set;

CSI of a specified carrier in the measurement carrier set, wherein the base station configures the specific carrier that is the specified carrier in the measurement carrier set for the UE through the field contained in the UE-specific RRC message or the downlink allocation PDCCH, and in case of configuration through the field contained in the downlink allocation PDCCH, it is necessary to add a field for the configuration function in Table 5, Table 6 and Table 7 in the implementation mode; and CSI of all carriers in the measurement carrier set, wherein, in such case, the time-domain size of the resource unit corresponding to transmission of the {HARQ-ACK feedback, CSI} is different from the corresponding time-domain size of the resource unit when the PDSCH is only allowed to be scheduled through the same carrier. For example, uplink data transmission is performed based on the subcarrier spacing 15 kHz, the time-domain size of the resource unit corresponding to transmission of the {HARQ-ACK feedback, CSI} when the PDSCH is only allowed to be scheduled through the same carrier is 8 milliseconds, and the time-domain size of the resource unit corresponding to transmission of the {HARQ-ACK feedback, CSI} when cross-carrier scheduling is allowed is 16 milliseconds (namely the time-domain size of the resource unit when cross-carrier scheduling is allowed is an integral multiple of that when the PDSCH is only allowed to be scheduled through the same carrier).

The measurement carrier set is a set formed by all the carriers allowed for PDSCH transmission (a cross-carrier scheduling carrier set); or, the measurement carrier set is a carrier set different from the cross-carrier scheduling carrier set, and the base station configures it for the UE through the UE-specific RRC message.

When the CSI is the CSI of the carrier transmitting the downlink allocation PDCCH, the subframe for CSI measurement of the UE is one of: all or part of subframes in a downlink subframe set transmitting the downlink allocation PDCCH and all or part of subframes in a downlink subframe between the end of downlink allocation PDCCH transmission and the start of PDSCH transmission. When the CSI is the CSI of the carrier transmitting the PDSCH, the subframe for CSI measurement of the UE is one of: all or part of the subframes in the downlink subframe set transmitting the PDSCH and all or part of the subframes in the downlink subframe set between the end of PDSCH transmission and the start of {HARQ-ACK feedback, CSI} transmission. Otherwise the subframe for CSI measurement of the UE is all or part of the subframes in the downlink subframe set between the end of PDSCH transmission and the start of {HARQ-ACK feedback, CSI} transmission. The base station configures the number of the subframe for CSI measurement (measurement subframe) for the UE through the UE-specific RRC message.

When the CSI is the CSI of the carrier with the best channel quality in the measurement carrier set or is the CSI of all the carriers in the measurement carrier set, a value range of the time-domain offset (relative to the end of PDSCH transmission) corresponding to transmission of the {HARQ-ACK feedback, CSI} is different from the corresponding time-domain offset when the PDSCH is only allowed to be scheduled through the same carrier. For example, under the subcarrier spacing 3.75 kHz, the value range of the corresponding time-domain offset is {0, 8} milliseconds when the PDSCH is only allowed to be scheduled through the same carrier, and the value range of the corresponding time-domain offset is {8, 16} milliseconds when cross-carrier scheduling of the PDSCH is allowed (namely a corresponding maximum time-domain offset when cross-carrier scheduling of the PDSCH is allowed is greater than a corresponding maximum time-domain offset when the PDSCH is only allowed to be scheduled through the same carrier). Under the subcarrier spacing 15 kHz, the value range of the corresponding time-domain offset is {0, 2, 4, 5} milliseconds when the PDSCH is only allowed to be scheduled through the same carrier, and the value range of the corresponding time-domain offset may be {4, 5, 8, 10} milliseconds when cross-carrier scheduling of the PDSCH is allowed.

It is to be noted that, when cross-carrier scheduling of the PDSCH is allowed, the method shown in implementation mode 1 (or implementation mode 2) and the method shown in implementation mode 3 may be used at the same time. As an option, the CSI in implementation mode 1 (or implementation mode 2) is the CSI of all the carriers in the measurement carrier set, and the CSI in implementation mode 3 is one of the CSI of the carrier transmitting the PDSCH, the CSI of the carrier transmitting the downlink allocation PDCCH, the CSI of the carrier with the best channel quality in the measurement carrier set and the CSI of the specified carrier in the measurement carrier set.

In the implementation mode, the base station schedules the UE for PDSCH and {HARQ-ACK feedback, CSI} transmission by use of the downlink allocation PDCCH. Adopting the method has the advantages that it is ensured that the overhead of the PDCCH configured to schedule the UE to perform CSI transmission is minimum and increase of the maximum number of detection times of PDCCH detection of the UE in a range of a search space is avoided.

In the embodiment, a content of the CSI is at least one of: a Channel Quality Indication (CQI), Reference Signal Received Power (RSRP), Reference Signal Received Quality (RSRQ), a repeated transmission count, a coverage level and a Signal to Interference plus Noise Ratio (SINR).

When the content of the CSI includes the CQI, an adopted CQI table may be shown as Table 8 (namely CQI information is represented with four bits). The six continuous entries indexed to be 2 to 7 are six CQI entries corresponding to a QPSK modulation manner in a CQI table of a Long Term Evolution (LTE) system, and the two entries indexed to be 1 and 8 are two CQI entries added for the NB-IoT system based on the six CQI entries and correspond to lower and higher QPSK code rates respectively.

TABLE 8

| CQI index | Modulation | Code rate × 1,024 | Efficiency |
| --- | --- | --- | --- |
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | QPSK | 756 | 1.4766 |
| 9~15 | Reserved | | |

In the embodiment, the CSI reporting mode corresponds to content information of the CSI. For example, there may be two CSI reporting modes. The CSI content corresponding to each of the first CSI reporting mode and the second CSI reporting mode may be one of all the entries in Table 9.

TABLE 9

| Index | First CSI reporting mode | Second CSI reporting mode |
| --- | --- | --- |
| 0 | CQI | Repeated transmission count |
| 1 | CQI | RSRP |
| 2 | CQI and SINR | Repeated transmission count |
| 3 | CQI and SINR | RSRP |
| 4 | CQI | Repeated transmission count and SINR |
| 5 | CQI | RSRP and SINR |
| 8 | CQI and RSRQ | Repeated transmission count |
| 9 | CQI and RSRQ | RSRP |
| 10 | CQI | Repeated transmission count and RSRQ |
| 11 | CQI | RSRP and RSRQ |

In such case, besides configuring the CSI reporting mode through the UE-specific RRC message or the uplink grant PDCCH or the downlink allocation PDCCH, the base station and the UE may also determine the CSI reporting mode according to a PRACH coverage level. For example, when the PRACH coverage level is 0, the first reporting mode is adopted, and when the coverage level is greater than 0, the second CSI reporting mode is adopted.

In the embodiment, when cross-carrier scheduling of the PDSCH is allowed, the CSI reporting mode may also correspond to carrier information corresponding to the CSI. For example, there are two CSI reporting modes. A carrier corresponding to the CSI corresponding to each of the first CSI reporting mode and the second CSI reporting mode is one of the entries in Table 10 (note: the carrier set in the table is a measurement carrier set).

TABLE 10

| Index | First CSI reporting mode | Second CSI reporting mode |
| --- | --- | --- |
| 0 | Carrier transmitting the PDSCH | All the carriers in the carrier set |
| 1 | Carrier transmitting the uplink grant PDCCH | All the carriers in the carrier set |
| 2 | Carrier transmitting the downlink allocation PDCCH | All the carriers in the carrier set |
| 3 | Carrier with best channel quality in the carrier set | All the carriers in the carrier set |
| 4 | Carrier transmitting the PDSCH | Carrier with best channel quality in the carrier set |
| 5 | Carrier transmitting the uplink grant PDCCH | Carrier with best channel quality in the carrier set |
| 6 | Carrier transmitting the downlink allocation PDCCH | Carrier with best channel quality in the carrier set |

In the embodiment, when cross-carrier scheduling of the PDSCH is allowed, the CSI reporting mode may also correspond to both the content information of the CSI and the carrier information corresponding to the CSI. For example, there are two CSI reporting modes. The CSI content corresponding to the first CSI reporting mode is one of the entries in Table 9, and the carrier corresponding to the corresponding CSI is one of the entries in Table 10. Like the first CSI reporting mode, the CSI content corresponding to the second CSI reporting mode is also one of the entries in Table 9, and the carrier corresponding to the corresponding CSI is also one of the entries in Table 10.

Embodiment 4

The embodiment of the present disclosure also provides a storage medium, in which a computer program is stored, the computer program being configured to run to execute the operations in the method embodiment applied to UE.

In at least one exemplary implementation of the embodiment, the storage medium may be configured to store a computer program configured to execute the following operations.

In S1, a PDCCH transmitted by a base station is received.

In S2, CSI is transmitted to the base station according to the PDCCH.

In at least one exemplary implementation of the embodiment, the storage medium may include, but not limited to, various medium capable of storing computer programs such as a U disk, a ROM, a RAM, a mobile hard disk, a magnetic disk or an optical disk.

The embodiment of the present disclosure also provides another storage medium, in which a computer program is stored, the computer program being configured to run to execute the operations in the method embodiment applied to a base station.

In at least one exemplary implementation of the embodiment, the storage medium may be configured to store a computer program configured to execute the following operations:

a PDCCH is transmitted to UE; and

CSI transmitted by the UE is received according to the PDCCH.

The embodiment of the present disclosure also provides an electronic device, which includes a memory and a processor. A computer program is stored in the memory. The processor is configured to run the computer program to execute the operations in any abovementioned method embodiment.

In at least one exemplary implementation of the embodiment, the electronic device may further include a transmission device and an input/output device. The transmission device is connected with the processor, and the input/output device is connected with the processor.

In at least one exemplary implementation of the embodiment, the processor in the embodiment may be configured to execute the following operations through the computer program.

In S1, a PDCCH transmitted by a base station is received.

In S2, CSI is transmitted to the base station according to the PDCCH.

In at least one exemplary implementation of the embodiment, exemplary examples in the embodiment may refer to the examples described in the abovementioned embodiments and exemplary implementation modes and will not be elaborated in the embodiment.

It is apparent that those skilled in the art should know that each module or each step of the present disclosure may be implemented through a universal computing device. They may be concentrated in a single computing device or distributed in a network formed by multiple computing devices. In at least one exemplary implementation of the embodiment, they may be implemented by program codes executable for the computing devices and thus may be stored in a storage device for execution with the computing devices. Moreover, in some cases, the shown or described operations may be executed in sequences different from those described here, or may form various integrated circuit modules respectively, or multiple modules or operations therein may form a single integrated circuit module for implementation. Therefore, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented in one or more computer-available storage media (including, but not limited to, a disk memory and an optical memory) including computer-available program codes.

The present disclosure is described with reference to flowcharts and/or block diagrams of the method, equipment (system) and computer program product according to the embodiment of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating operations are executed on the computer or the other programmable data processing equipment to generate processing implemented by the computer, and operations for realizing the function specified in one flow or many flows in the flowcharts and/or one block or many blocks in the block diagrams are provided by the instructions executed on the computer or the other programmable data processing equipment.

The above is only the exemplary embodiment of the present disclosure and not intended to limit the scope of protection of the present disclosure.

INDUSTRIAL APPLICABILITY

In the embodiments of the present disclosure, the CSI is not periodically reported but transmitted to the base station according to scheduling of PDCCH data, so that the technical problem in the related art that an uplink overhead is excessively high when CSI is transmitted is solved, a resource overhead of CSI transmission between the UE and the base station is reduced, and a resource utilization rate is increased.

What is claimed is:

1. An information transmission method, comprising:
receiving a Physical Downlink Control Channel (PDCCH) transmitted by a base station; and
transmitting Channel State Information (CSI) to the base station according to the PDCCH;
wherein after receiving the PDCCH transmitted by the base station, the method further comprises: transmitting a Hybrid Automatic Repeat request-Acknowledgement (HARQ-ACK) feedback to the base station according to the PDCCH, wherein a frequency-domain size of a resource unit corresponding to CSI transmission is the same as a frequency-domain size of a resource unit corresponding to HARQ-ACK feedback transmission, and a time-domain size of the resource unit corresponding to the CSI transmission is N times a time-domain size of the resource unit corresponding to the HARQ-ACK feedback transmission, N being greater than 1 and a value of N being a preset value or configured for a UE by the base station.

2. The method as claimed in claim 1, wherein the PDCCH is an uplink grant PDCCH or a downlink allocation PDCCH.

3. The method as claimed in claim 1, further comprising: acquiring indication information configured to trigger User Equipment (UE) to perform CSI reporting, the indication information being contained in at least one of:
a subcarrier indication field contained in the PDCCH;
a modulation and coding scheme field contained in the PDCCH;
a field contained in a UE-specific Radio Resource Control (RRC) message;
a Physical Downlink Shared Channel (PDSCH) transmission related field contained in the PDCCH; and
K continuous bits contained in the PDCCH, a value of K being a preset value or determined according to a subcarrier spacing adopted in uplink data transmission and K being a positive integer.

4. The method as claimed in claim 3, wherein
the subcarrier indication field comprises Q bits, wherein first P bits in the Q bits taking a preset value indicates that the CSI reporting is triggered, and when the CSI reporting is triggered, last Q-P bits in the Q bits are configured to indicate a subcarrier allocated for CSI transmission,
both Q and P being integers greater than 0, Q being greater than P and a value of P being a preset value or determined according to the subcarrier spacing adopted in uplink data transmission.

5. The method as claimed in claim 4, wherein the subcarrier allocated for the CSI transmission is one of X subcarriers, wherein the X subcarriers comprise Y continuous subcarriers close to an upper sideband and X-Y continuous subcarriers close to a lower sideband, both X and Y being integers greater than 1 and X being greater than Y.

6. The method as claimed in claim 3, wherein
the PDSCH transmission related field is a new data indicator field.

7. The method as claimed in claim 1 wherein the HARQ-ACK feedback is transmitted to the base station at first, and the CSI is transmitted to the base station after the transmission of the HARQ-ACK feedback is completed.

8. The method as claimed in claim 1, wherein the CSI comprises at least one of: CSI of a carrier for receiving a PDSCH, CSI of a carrier for receiving the PDCCH, CSI of a carrier with best channel quality in a measurement carrier set, CSI of a specified carrier in the measurement carrier set and CSI of all carriers in the measurement carrier set.

9. The method as claimed in claim 8, wherein the measurement carrier set is a set formed by all carriers allowed for PDSCH transmission.

10. The method as claimed in claim 1, before transmitting the CSI to the base station according to the PDCCH, further comprising: performing CSI measurement, a subframe for CSI measurement being at least one of:
all or part of subframes in a downlink subframe set for receiving PDSCH; all or part of subframes in a downlink subframe set for receiving the PDCCH; all or part of subframes in a downlink subframe set positioned between the end of PDSCH reception and the start of CSI transmission; all or part of subframes in a downlink subframe set positioned between the end of PDCCH reception and the start of PDSCH reception; and all or part of subframes in a downlink subframe set positioned between the end of PDCCH reception and the start of CSI transmission.

11. The method as claimed in claim 1, wherein a CSI reporting mode corresponding to the CSI is determined according to one of a modulation and coding scheme field contained in the PDCCH and a Physical Random Access Channel (PRACH) coverage level, and the CSI reporting mode corresponds to at least one of the following information:
a carrier corresponding to the CSI and a content of the CSI.

12. The method as claimed in claim 11, wherein determining the CSI reporting mode according to the PRACH coverage level comprises that: when the PRACH coverage level is less than or equal to a preset threshold value, the CSI reporting mode is a first mode; and when the PRACH coverage level is greater than the preset threshold value, the CSI reporting mode is a second mode.

13. An electronic device, comprising a memory and a processor, wherein a computer program is stored in the memory; and the processor is configured to run the computer program to execute the method as claimed in claim 1.

14. An information transmission method, comprising:
transmitting a Physical Downlink Control Channel (PDCCH) to User Equipment (UE); and
receiving, according to the PDCCH, Channel State Information (CSI) transmitted by the UE;
wherein after transmitting the PDCCH to the UE, the method further comprises: receiving a Hybrid Automatic Repeat request-Acknowledgement (HARQ-ACK) feedback according to the PDCCH, wherein a frequency-domain size of a resource unit corresponding to CSI transmission is the same as a frequency-domain size of a resource unit corresponding to HARQ-ACK feedback transmission, and a time-domain size of the resource unit corresponding to the CSI transmission is N times a time-domain size of the resource unit corresponding to the HARQ-ACK feedback transmission, N being greater than 1 and a value of N being a preset value or configured for a UE by the base station.

15. The method as claimed in claim 14, wherein the PDCCH is an uplink grant PDCCH or a downlink allocation PDCCH.

16. The method as claimed in claim 14, further comprising: transmitting indication information configured to trigger the UE to perform CSI reporting, the indication information being contained in at least one of:
a subcarrier indication field contained in the PDCCH;
a modulation and coding scheme field contained in the PDCCH;
a field contained in a UE-specific Radio Resource Control (RRC) message;
a Physical Downlink Shared Channel (PDSCH) transmission related field contained in the PDCCH; and
K continuous bits contained in the PDCCH, a value of K being a preset value or determined according to a subcarrier spacing adopted in uplink data transmission and K being a positive integer.

17. An electronic device, comprising a memory and a processor, wherein a computer program is stored in the memory; and the processor is configured to run the computer program to execute the method as claimed in claim 14.

* * * * *